United States Patent
Awano et al.

(10) Patent No.: US 11,988,266 B2
(45) Date of Patent: May 21, 2024

(54) SHOCK ABSORBER

(71) Applicant: KYB CORPORATION, Tokyo (JP)

(72) Inventors: Koichiro Awano, Tokyo (JP); Takahisa Mochizuki, Tokyo (JP); Sodai Shimauchi, Gifu (JP)

(73) Assignee: KYB Corporation, Tokyo (JP)

( * ) Notice: Subject to any disclaimer, the term of this patent is extended or adjusted under 35 U.S.C. 154(b) by 382 days.

(21) Appl. No.: 17/434,973

(22) PCT Filed: Feb. 28, 2020

(86) PCT No.: PCT/JP2020/008380
§ 371 (c)(1),
(2) Date: Aug. 30, 2021

(87) PCT Pub. No.: WO2020/179684
PCT Pub. Date: Sep. 10, 2020

(65) Prior Publication Data
US 2022/0128117 A1    Apr. 28, 2022

(30) Foreign Application Priority Data

Mar. 4, 2019  (JP) ................................. 2019-038129

(51) Int. Cl.
*F16F 9/46* (2006.01)
*B62K 25/04* (2006.01)
(Continued)

(52) U.S. Cl.
CPC ................ *F16F 9/466* (2013.01); *F16F 9/19* (2013.01); *F16F 9/34* (2013.01);
(Continued)

(58) Field of Classification Search
CPC ...... F16F 9/466; F16F 9/34; F16F 9/19; F16F 2234/02; F16F 2232/08; F16F 2228/066;
(Continued)

(56) References Cited

U.S. PATENT DOCUMENTS 6,332,622 B1 * 12/2001 Nakamura .............. F16F 9/464
                                                              188/266.5
6,860,370 B2 * 3/2005 Nakadate .............. F16F 9/3485
                                                              188/282.5
(Continued)

FOREIGN PATENT DOCUMENTS

JP   2001-241484 A   9/2001
JP   2007-303545 A   11/2007
(Continued)

OTHER PUBLICATIONS

May 26, 2023, German Office Action issued for related DE Application No. 11 2020 001 059.7.
(Continued)

*Primary Examiner* — Pamela Rodriguez
(74) *Attorney, Agent, or Firm* — Paratus Law Group, PLLC

(57) ABSTRACT

A shock absorber includes a hard-side damping element that gives resistance to a flow of liquid from an extension side chamber toward a compression side chamber, an electromagnetic valve capable of changing an opening area of an extension side bypass passage that bypasses the hard-side damping element and communicates the extension side chamber and the compression side chamber, and a soft-side damping element provided in the extension side bypass passage in series with the electromagnetic valve, in which the hard-side damping element includes an orifice and a leaf valve provided in parallel with the orifice, and in which the soft-side damping element includes an orifice having an opening area larger than an opening area of the orifice.

5 Claims, 8 Drawing Sheets

(51) Int. Cl.
  *B62K 25/08* (2006.01)
  *F16F 9/19* (2006.01)
  *F16F 9/34* (2006.01)
(52) U.S. Cl.
  CPC ........ *B62K 2025/044* (2013.01); *B62K 25/08* (2013.01); *F16F 2222/12* (2013.01); *F16F 2228/066* (2013.01); *F16F 2232/08* (2013.01); *F16F 2234/02* (2013.01)
(58) Field of Classification Search
  CPC ................ F16F 2222/12; B62K 25/08; B62K 2025/044
  See application file for complete search history.

(56) References Cited

U.S. PATENT DOCUMENTS

| | | | |
|---|---|---|---|
| 10,036,444 B2 * | 7/2018 | Kim | F16F 9/466 |
| 2017/0268595 A1 | 9/2017 | Inagaki et al. | |
| 2019/0107169 A1 | 4/2019 | Hagidaira et al. | |

FOREIGN PATENT DOCUMENTS

| | | |
|---|---|---|
| JP | 2010-007758 A | 1/2010 |
| JP | 2010-031975 A | 2/2010 |
| JP | 2013-133896 A | 7/2013 |
| JP | 2014-156885 A | 8/2014 |
| JP | 2016-098950 A | 5/2016 |
| JP | 2017-020591 A | 1/2017 |
| JP | 2018-004023 A | 1/2018 |
| JP | 2018-004024 A | 1/2018 |
| JP | 2018-004026 A | 1/2018 |

OTHER PUBLICATIONS

Nov. 22, 2022, Chinese Office Action issued for related CN Application No. 202080009973.5.

* cited by examiner

-- Prior Art --

-- Prior Art --

SHOCK ABSORBER

CROSS REFERENCE TO PRIOR APPLICATION

This application is a National Stage Patent Application of PCT International Patent Application No. PCT/JP2020/008380 (filed on Feb. 28, 2020) under 35 U.S.C. § 371, which claims priority to Japanese Patent Application No. 2019-038129 (filed on Mar. 4, 2019), which are all hereby incorporated by reference in their entirety.

TECHNICAL FIELD

The present invention relates to an improvement of a shock absorber.

BACKGROUND ART

Conventionally, some shock absorbers contain liquid such as hydraulic oil in a cylinder, give resistance to a flow of the liquid generated when a piston moves in the cylinder by a damping element, and exert a damping force caused by the resistance.

The damping element includes, for example, an orifice and a leaf valve provided in parallel with the orifice. When the piston speed is in a low speed range and a differential pressure between the upstream side and the downstream side of the damping element is lower than a valve opening pressure of the leaf valve, the liquid passes only through the orifice. On the other hand, when the piston speed is in a middle and high speed range and the differential pressure is equal to or higher than the valve opening pressure of the leaf valve, the liquid passes through the leaf valve.

Therefore, the characteristic of the damping force (hereinafter, referred to as a "damping force characteristic") with respect to the piston speed of the shock absorber changes from an orifice characteristic proportional to the square of the piston speed specific to the orifice to a valve characteristic proportional to the piston speed specific to the leaf valve when the leaf valve is opened.

In addition, for the purpose of adjusting the generated damping force, some shock absorbers include a bypass passage that bypasses the damping element, a needle valve that adjusts the opening area of the bypass passage, and a pilot valve that controls the back pressure of the leaf valve constituting the damping element (for example, Patent Literatures 1 and 2).

CITATION LIST

Patent Literature

Patent Literature 1: JP 2010-7758 A
Patent Literature 2: JP 2014-156885 A

SUMMARY OF INVENTION

Technical Problem

For example, in the shock absorber including the needle valve described in JP 2010-7758 A, when the needle valve is driven to increase the opening area of the bypass passage, the flow rate of the liquid passing through the damping element decreases to decrease the generated damping force (soft mode in FIG. 7). On the other hand, when the opening area of the bypass passage is reduced, the flow rate of the liquid passing through the damping element increases to increase the generated damping force (hard mode in FIG. 7).

Such adjustment of the damping force by the needle valve is mainly used to adjust the damping force when the piston speed is in the low speed range. When the opening area of the bypass passage is adjusted by the needle valve, the damping force when the piston speed is in the middle and high speed range is also slightly adjusted, but it is difficult to increase the adjustment range.

On the other hand, in the shock absorber including the pilot valve described in JP 2014-156885 A, when a valve opening pressure of the pilot valve is lowered to reduce the back pressure of the leaf valve, the valve opening pressure of the leaf valve is lowered to decrease the generated damping force (soft mode in FIG. 8). On the other hand, when the valve opening pressure of the pilot valve is increased to increase the back pressure of the leaf valve, the valve opening pressure of the leaf valve increases to increase the generated damping force (hard mode in FIG. 8).

As described above, when the back pressure of the leaf valve is controlled to change the valve opening pressure, the adjustment range of the damping force when the piston speed is in the middle and high speed range can be increased. However, in this case, since the characteristic line indicating the damping force characteristic in the middle and high speed range shifts up and down without changing the inclination thereof, particularly in the hard mode, the inclination of the characteristic line rapidly changes when the characteristic line shifts from the low speed range to the middle and high speed range. For this reason, when the shock absorber is mounted on a vehicle, there is a possibility that a sense of discomfort is given to an occupant and the ride comfort is deteriorated.

In view of this, an object of the present invention is to solve these problems, and to provide a shock absorber capable of increasing an adjustment range of a damping force when a piston speed is in a middle and high speed range and improving ride comfort when the shock absorber is mounted on a vehicle.

Solution to Problem

A shock absorber for solving the above problems includes: a hard-side damping element that gives resistance to a flow of liquid from an extension side chamber to a compression side chamber which are partitioned by a piston movably inserted into a cylinder; an electromagnetic valve capable of changing an opening area of a bypass passage that bypasses the hard-side damping element and communicates the extension side chamber and the compression side chamber; and a soft-side damping element provided in the bypass passage in series with the electromagnetic valve, in which the hard-side damping element includes an orifice and a leaf valve provided in parallel with the orifice, and in which the soft-side damping element includes an orifice.

According to the above configuration, the characteristic of the damping force Generated by the shock absorber becomes an orifice characteristic specific to the orifice when a piston speed is in a low speed range, and becomes a valve characteristic specific to the leaf valve when the piston speed is in a middle and high speed range. When the opening area of the bypass passage is changed by the electromagnetic valve, a distribution ratio of a flow passing through the hard-side damping element and a flow passing through the soft-side damping element in the liquid moving from the extension side chamber to the compression side chamber is changed, so that both a damping coefficient when the piston speed is in the low speed range and a damping coefficient when the piston speed is in the middle and high speed range can be freely set, and an adjustment range of the generated damping force can be increased.

Furthermore, in a soft mode in which the opening area of the bypass passage is increased, both the damping coefficient when the piston speed is in the low speed range and the damping coefficient when the piston speed is in the middle and high speed range can be decreased. On the other hand, in a hard mode in which the opening area of the bypass passage is reduced, both the damping coefficient when the piston speed is in the low speed range and the damping coefficient when the piston speed is in the middle and high speed range can be increased. As a result, when the damping force characteristic changes from the orifice characteristic in the low speed range to the valve characteristic in the middle and high speed range, the change in the inclination of the characteristic line can be made gentle in any mode. Therefore, when the shock absorber according to the present invention is mounted on a vehicle, ride comfort of the vehicle can be improved.

Further, in the shock absorber, the soft side damping element may include a leaf valve provided in parallel with the large-diameter orifice. As a result, even if a valve having high valve rigidity is employed as the leaf valve of the hard-side damping element, the damping force in the soft mode does not become excessive. Therefore, the adjustment range of the damping force when the piston speed is in the middle and high speed range can be further increased.

Further, in the shock absorber, the electromagnetic valve may be set so that an opening degree changes in proportion to an energization amount. As a result, the opening area of the bypass passage can be adjusted steplessly.

Further, the shock absorber, the electromagnetic valve may include a cylindrical holder having a port formed therein and connected to the bypass passage, a spool that is reciprocatably inserted into the holder and can open and close the port, a biasing spring that biases the spool to one side in a moving direction of the spool, and a solenoid that applies a thrust in a direction opposite to a biasing force of the biasing spring to the spool. In this way, since the opening degree of the electromagnetic valve can be easily increased without increasing a stroke amount of the spool, which is a valve body of the electromagnetic valve, an adjustment range of the opening area of the bypass passage can be easily increased. Furthermore, the relationship between the opening degree and the energization amount of the electromagnetic valve can be easily set to a proportional relationship having a positive proportional constant or a negative proportional relationship having a negative proportional constant.

Further, in the shock absorber, the piston may be coupled to the other end of the piston rod, and the shock absorber may include a tank connected to the compression side chamber, and a check valve that allows only a flow of liquid from the compression side chamber to the extension side chamber. In this way, the shock absorber can be a unidirectional shock absorber that generates a damping force only is an extension stroke.

Advantageous Effects of Invention

According to the shock absorber of the present invention, it is possible to increase the adjustment range of the damping force when the piston speed is in the middle and high speed range and improve the ride comfort when the shock absorber is mounted on the vehicle.

DESCRIPTION OF EMBODIMENTS

Figure 1:
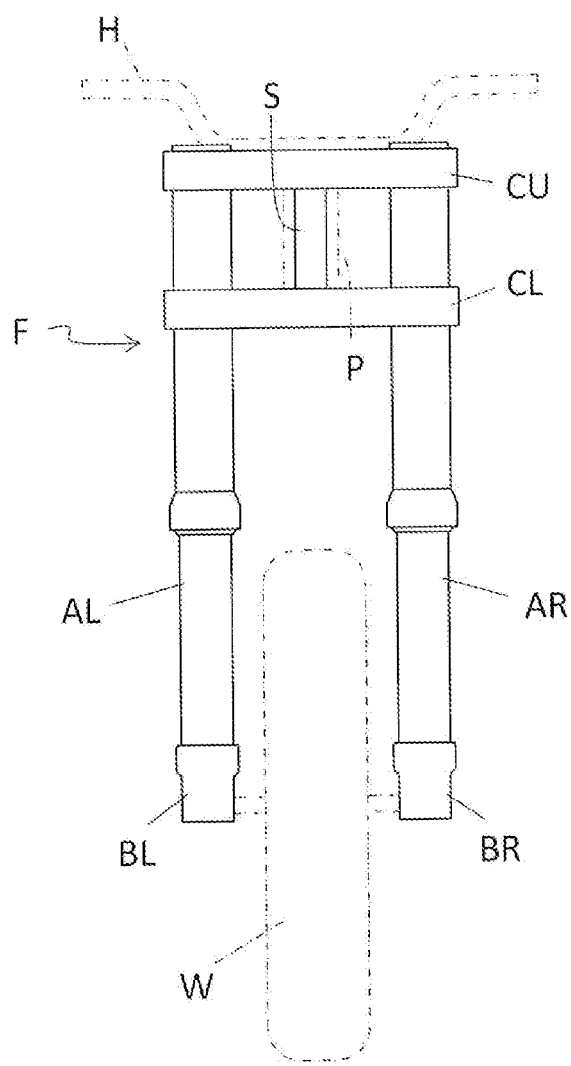
FIG. 1 is a front view schematically illustrating an attached state of a shock absorber on an extension side which is a shock absorber according to an embodiment of the present invention.

A shock absorber according to an embodiment of the present invention will be described below with reference to the drawings. The same reference numerals assigned throughout the several figures indicate the same or corresponding components. In addition, the shock absorber according to the embodiment of the present invention is used for a front fork that suspends a front wheel of a saddle-ride type vehicle. In the following description, the upper and lower sides in a state in which the front fork including the shock absorber is attached to a vehicle are simply referred to as an "upper side" and a "lower side" unless otherwise specified.

As illustrated in FIG. 1, a front fork F includes a pair of shock absorbers AL and AR, axle-side brackets BL and BR that respectively couple lower end portions of the shock absorbers AL and AR to an axle of a front wheel W, and a pair of upper and lower vehicle-body-side brackets CU and CL that couple upper end portions of the shock absorbers AL and AR. The vehicle-body-side brackets CU and CL are coupled by a steering shaft S.

The steering shaft S is rotatably inserted into the head pipe P of the vehicle body, and a steering wheel H is coupled to the upper bracket CU. When the steering wheel H is rotated, the entire front fork F rotates about the steering shaft S. At this time, the front wheel W rotates together with the front fork F to change its direction.

In the present embodiment, one of the pair of shock absorbers AL and AR is a shock absorber AL on an extension side for generating and adjusting an extension side damping force, and the shock absorber AL is the shock absorber according to the embodiment of the present invention. The other shock absorber is a shock absorber AR on a compression side for generating and adjusting a compression side damping force. In FIG. 1, the left side in the drawing is the shock absorber AL on the extension side, and the right side is the shock absorber AR on the compression side, but it is a matter of course that these arrangements may be reversed.

First, the shock absorber AL on the extension side which is the shock absorber according to the embodiment of the present invention will be specifically described.

Figure 2:
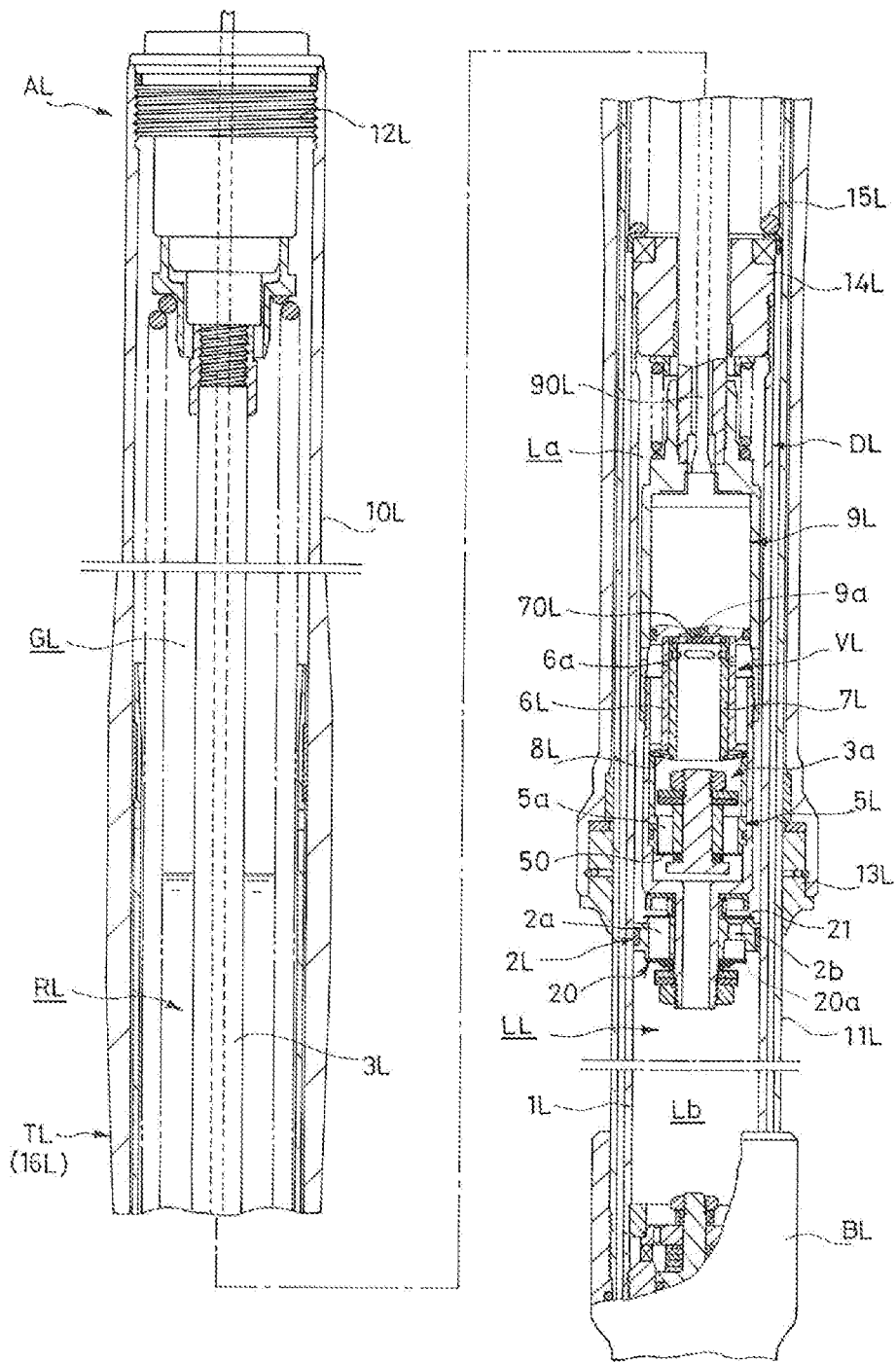
FIG. 2 is a longitudinal sectional view of the shock absorber on the extension side which is the shock absorber according to the embodiment of the present invention.

As illustrated in FIG. 2, the shock absorber AL on the extension side includes a telescopic tube member TL including an outer tube 10L and an inner tube 11L slidably inserted into the outer tube 11L. In the present embodiment, the tube member TL is an inverted type, the outer tube 10L is a vehicle-body-side tube, and the vehicle-body-side brackets CU and CL are coupled, and the inner tube 11L is an axle-side tube, and the axle-side bracket BL is coupled.

Then, when the front wheel W vibrates up and down as the saddle-ride type vehicle travels on an uneven road surface or the like, the inner tube 11L moves in and out of the outer tube 10L, and the tube member TL expands and contracts. Such expansion and contraction of the tube member TL is also referred to as expansion and contraction of the shock absorber AL. The tube member TL may be an upright type, and the outer tube 10L may be an axle-side tube and the inner tube 11L may be a vehicle-body-side tube.

Subsequently, the upper end of the outer tube 10L, which is the upper end of the tube member TL, is closed by a cap 12L. On the other hand, the lower end of the inner tube 11L, which is the lower end of the tube member TL, is closed by the axle-side bracket BL. Furthermore, a cylindrical gap formed between the overlapping portion of the outer tube 10L and the inner tube 11L is closed by an annular seal member 13L that is attached to the lower end of the outer tube 10L and slidably contacts the outer periphery of the inner tube 11L.

In this way, the inside of the tube member TL is a closed space, and a shock absorber main body DL is accommodated in the tube member TL. The shock absorber main body DL includes a cylinder 1L provided in the inner tube 11L, a piston 21 slidably inserted into the cylinder 1L, and a piston rod 3L having a lower end coupled to the piston 2L and an upper end protruding to the outside of the cylinder 1L and coupled to the cap 12L.

Since the cap 12L is coupled to the outer tube 10L, it can be said that the piston rod 3L is coupled to the outer tube 10L. Furthermore, the cylinder 1L is coupled to the inner tube 11L. In this manner, the shock absorber main body DL is interposed between the outer tube 10L and the inner tube 11L.

An annular head member 14L is attached to the upper end of the cylinder 1L, and the piston rod 3L passes through the inside of the head member 14L so as to be movable in the axial direction. The head member 14L slidably supports the piston rod 3L. A suspension spring 15L including a coil spring is interposed between the head member 14L and the cap 12L.

When the shock absorber AL on the extension side expands and contracts and the inner tube 11L moves in and out of the outer tube 10L, the piston rod 3L moves in and out of the cylinder 1L, and the piston 2L moves up and down (in the axial direction) in the cylinder 1L. When the shock absorber AL on the extension side contracts and the piston rod 3L enters the cylinder 1L, the suspension spring 15L is compressed and exerts an elastic force to bias the shock absorber AL on the extension side in the extension direction. In this manner, the suspension spring 15L exerts an elastic force corresponding to the compression amount to elastically support the vehicle body.

The shock absorber AL on the extension side of the present embodiment is a single-rod type, and the piston rod 3L extends from one side of the piston 2L to the outside of the cylinder 1L. However, the shock absorber AL on the extension side may be a double-rod type, and the piston rod may extend from both sides of the piston to the outside of the cylinder. Furthermore, the piston rod 3L may protrude downward from the cylinder and be coupled to the axle side, and the cylinder 1L may be coupled to the vehicle body side. Furthermore, the suspension spring 15L may be a spring other than a coil spring such as an air spring.

Subsequently, a liquid chamber filled with liquid such as hydraulic oil is formed in the cylinder 1L, and the liquid chamber LL is partitioned into an extension side chamber La and a compression side chamber Lb by the piston 2L. The extension side chamber here is a chamber that is compressed by the piston when the shock absorber extends, among the two chambers partitioned by the piston. On the other hand, the compression side chamber is a chamber that is compressed by the piston when the shock absorber contracts, among the two chambers partitioned by the piston.

In addition, a space outside the cylinder 1L, more specifically, a space between the shock absorber main body DL and the tube member TL is a liquid storage chamber RL. In the liquid storage chamber RL, the same liquid as the liquid in the cylinder 1L is stored, and a gas chamber GL in which gas such as air is sealed is formed on the upper side of the liquid level. In this manner, the tube member TL functions as an outer shell of a tank 16L that stores the liquid separately from the liquid in the cylinder 1L.

The liquid storage chamber RL in the tank 16L communicates with the compression side chamber Lb, and the pressure in the compression side chamber Lb is always substantially the same pressure (tank pressure) as the pressure in the tank 16L (liquid storage chamber RL). The piston 2L is provided with an extension side passage 2a and a compression side passage 2b that communicate the extension side chamber La and the compression side chamber Lb, and there are attached a hard-side damping element 20 that gives resistance to the flow of the liquid from the extension side chamber L1 toward the compression side chamber Lb in the extension side passage 2a, and a compression side check valve 21 that allows the flow of the liquid from the compression side chamber Lb toward the extension side chamber La in the compression side passage 2b.

The hard-side damping element 20 includes a leaf valve 20a stacked on the lower side of the piston 2L, and an orifice 20b (FIG. 4) provided in parallel with the leaf valve 20a. The leaf valve 20a is a thin annular plate formed of metal or the like, or a laminate in which the annular plates are stacked, has elasticity, and is attached to the piston 21 in a state where deflection on the outer peripheral side is allowed. The pressure in the extension side chamber La acts in a direction in which the outer peripheral portion of the leaf valve 20a is bent downward. The orifice 20b is formed by a notch provided in the outer peripheral portion of the leaf valve 20a seated on and separated from a valve seat of the piston 2L, a stamp provided in the valve seat, or the like.

The extension side chamber La is compressed by the piston 2L when the shock absorber AL on the extension side extends, and the internal pressure thereof increases and becomes higher than the pressure in the compression side chamber Lb. When the piston speed is in a low speed range at the time of extension of the shock absorber AL on the extension side and a differential pressure between the extension side chamber La and the compression side chamber Lb is lower than the valve opening pressure of the leaf valve 20a, the liquid flows through the orifice 20b from the extension side chamber La to the compression side chamber Lb, and resistance is applied to the flow of the liquid. In addition, when the piston speed increases at the time of extension of the shock absorber AL on the extension side and the piston speed is in a middle and high speed range, and the differential pressure increases and becomes equal to or higher than the valve opening pressure of the leaf valve 20a, the outer peripheral portion of the leaf valve 20a bends, so that the liquid flows from the extension side chamber La to the compression side chamber Lb through the gap formed between the outer peripheral portion and the piston 2L, and resistance is applied to the flow of the liquid.

As described above, the hard-side damping element 20 including the orifice 20b and the leaf valve 20a arranged in parallel with the orifice 20b is a first damping element on the extension side that gives resistance to the flow of the liquid from the extension side chamber La to the compression side chamber Lb when the shock absorber AL on the extension side extends. The resistance by the hard-side damping element 20 on the extension side is caused by the orifice 20b when the piston speed is in the low speed range, and caused by the leaf valve 20a when the piston speed is in the middle and high speed range.

On the other hand, the compression side check valve 21 opens the compression side passage 2b when the shock absorber AL on the extension side contracts, and allows the flow of the liquid from the compression side chamber Lb toward the extension side chamber La in the compression side passage 2b, but maintains the compression side passage 2b in a closed state when the shock absorber AL on the extension side extends. The compression side check valve 21 of the present embodiment is a leaf valve, but may be a poppet valve or the like.

Subsequently, the piston rod 3L is provided with a damping force adjustment unit for changing the flow rate of the liquid passing through the hard-side damping element 20. The damping force adjustment unit includes an electromagnetic valve VL capable of changing the opening area of an extension side bypass passage 3a that bypasses the hard-side damping element 20 and communicates the extension side chamber La and the compression side chamber Lb, and a soft-side damping element 50 provided in series with an electromagnetic valve VR partway in the extension side bypass passage 3a.

Figure 3:
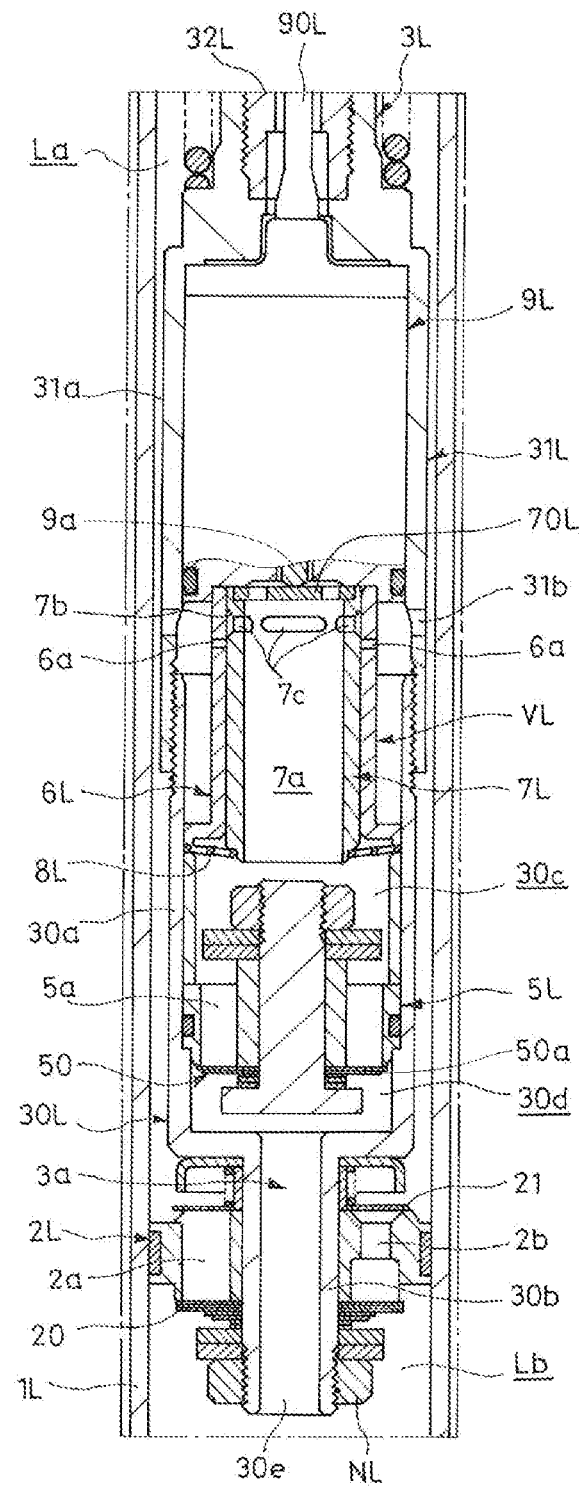
FIG. 3 is a vertical sectional view illustrating a part of FIG. 2 in an enlarged manner.

More specifically, as illustrated in FIG. 3, the piston rod 31 includes a piston holding member 30L positioned at a tip thereof, a solenoid case member 31L connected to a terminal side thereof, and a cylindrical rod main body 32L connected to a terminal side thereof and extending to the outside of the cylinder 1L. The piston holding member 30L includes a bottomed cylindrical housing portion 30a and a shaft portion 30b protruding downward from a bottom portion of the housing portion 30a, and an annular piston 2L is fixed to an outer periphery of the shaft portion 30b with a nut NL.

A valve case 5L that partitions the inside of the cylindrical portion of the housing portion 30a into an upper chamber 30c and a lower chamber 30d is fixed to the inner periphery of the cylindrical portion of the housing Portion. 30a. In the valve case 5L, a passage 5a that communicates the upper chamber 30c and the lower chamber 30d is formed, and the soft-side damping element 50 is provided in the passage 5a. Further, a longitudinal hole 30e that opens downward and communicates with the inside of the housing portion 30a is formed in the shaft portion 30b of the piston holding member 30L, and the lower chamber 30d and the compression side chamber Lb are communicated with each other through the longitudinal hole 30e.

Subsequently, the solenoid case member 311 includes a cylindrical portion 31a screwed to the outer periphery of the upper end of the housing portion 30a. A lateral hole 31b opened to the side is formed in the cylindrical portion 31a, and the extension side chamber La and the inside of the solenoid case member 311 are communicated with each other by the lateral hole 31b. The electromagnetic valve VL is provided partway in the passage connecting the lateral hole 31b and the upper chamber 30c.

In the present embodiment, the extension side bypass passage 3a that includes the lateral hole 31b, the upper chamber 30c, the lower chamber 30d, and the longitudinal hole 30e formed in the solenoid case member 31L or the piston holding member 30L and bypasses the hard-side damping element 20 is formed. The electromagnetic valve VL and the soft-side damping element 50 are provided in series partway in the extension side bypass passage 3a. The outer diameters of the solenoid case member 31L and the piston holding member 30L accommodating the electromagnetic valve VL and the soft-side damping element 50 are smaller than the inner diameter of the cylinder 1L, so that the extension side chamber La is not partitioned by these members.

The soft-side damping element 50 includes a leaf valve 50a stacked on the lower side of the valve case 5L, and an orifice 50b (FIG. 4) provided in parallel with the leaf valve 50a.

The leaf valve 50a is a thin annular plate formed of metal or the like, or a laminate in which the annular plates are stacked, has elasticity, and is attached to the valve case 5L in a state where deflection on the outer peripheral side is allowed. The pressure in the upper chamber 30c acts in a direction in which the outer peripheral portion of the leaf valve 50a is bent downward. The orifice 50b is formed by a notch provided in the outer peripheral portion of the leaf valve 50a seated on and separated from a valve seat of valve case 5L, a stamp provided in the valve seat, or the like.

The pressure in the upper chamber 30c is increased by receiving the pressure in the extension side chamber La when the shock absorber AL on the extension side extends and the electromagnetic valve VL opens the extension side bypass passage 3a. When the piston speed is in the low speed range at the time of extension of the shock absorber AL on the extension side, and the differential pressure between the upper chamber 30c and the lower chamber 30d is lower than the valve opening pressure of the leaf valve 50a, the liquid passes through the orifice 50b from the upper chamber 30c to the lower chamber 30d, that is, from the extension side chamber La to the compression side chamber Lb, and resistance is applied to the flow of the liquid. In addition, when the piston speed increases at the time of extension of the shock absorber AL on the extension side and the piston speed is in the middle and high speed range, and the differential pressure increases and becomes equal to or higher than the valve opening pressure of the leaf valve 50a, the outer peripheral portion of the leaf valve 50a bends, so that the liquid flows through the gap formed between the outer peripheral portion and the valve case 5L from the upper chamber 30c to the lower chamber 30d, that is, from the extension side chamber La to the compression side chamber Lb, and resistance is applied to the flow of the liquid.

As described above, the soft-side damping element 50 including the orifice 50b and the leaf valve 50a arranged in parallel with the orifice 50b is a second damping element on the extension side that gives resistance to the flow of the liquid from the extension side chamber La to the compression side chamber Lb through the extension side bypass passage 3a when the shock absorber AL on the extension side extends. The resistance by the soft-side damping element 50 on the extension side is caused by the orifice 50b when the piston speed is in the low speed range, and caused by the leaf valve 50a when the piston speed is in the middle and high speed range.

In addition, the leaf valve 50a of the soft-side damping element 50 is a valve having lower valve rigidity (more flexible) than the leaf valve 20a of the hard-side damping element 20, and when the flow rates are the same, the resistance (pressure loss) given to the flow of the liquid is small. In other words, the liquid is more likely to pass through the leaf valve 50a than the leaf valve 20a under the same condition. In addition, the orifice 50b of the soft-side damping element 50 is a large-diameter orifice having a larger opening area than the orifice 20b of the hard-side damping element 20, and when the flow rates are the same, the resistance (pressure loss) given to the flow of the liquid is small.

Subsequently, the electromagnetic valve VL includes a cylindrical holder 6L fixed in the piston rod 3L, a spool 7L reciprocably inserted into the holder 6L, a biasing spring 8L that biases the spool 7L in one direction of the moving direction, and a solenoid 9L that applies a thrust in a direction opposite to a biasing force of the biasing spring 8L to the spool 7L. Then, the opening degree of the electromagnetic valve VL is adjusted by changing the position of the spool 7L in the holder 6L.

More specifically, the holder 6L is disposed along the central axis of the piston rod 3L above the valve case 5L in the piston rod 3L in a state where one end in the axial direction is directed to the upper side (solenoid case member 31L side) and the other end is directed to the lower side (valve case 5L side). Furthermore, one or more ports 6a penetrating in the radial direction are formed in the holder 6L. The ports 6a communicate with the extension side chamber La via the lateral hole 31b of the solenoid case member 31L, and are opened and closed by the spool 7L.

The spool 7L has a cylindrical shape and is slidably inserted into the holder 6L. A plate 70L is stacked on the upper end of the spool 7L, and a plunger 9a (described later) of the solenoid 9L abuts on the plate 70L. On the other hand, the biasing spring 8L abuts on the lower end of the spool 7L to bias the spool 7L in a push-up direction.

A center hole 7a formed at the center of the spool 7L opens downward and communicates with the upper chamber 30c. Further, in the spool 7L, an annular groove 7b is formed along the circumferential direction of the outer periphery thereof, and one or more side holes 7c that communicate the inside of the annular groove 7b with the center hole 7a are formed. As a result, the inside of the annular groove 7b communicates with the upper chamber 30c via the side holes 7c and the center hole 7a.

According to the above configuration, when the spool 7L is at a position where the annular groove 7b face the ports 6a of the holder 6L, communication between the extension side chamber La and the upper chamber 30c is allowed. The state in which the annular groove 7b and the ports 6a face each other here refers to a state in which the annular groove 7b and the ports 6a overlap each other as viewed in the radial direction, and the opening area of the extension side bypass passage 3a changes according to the overlap amount.

For example, when the overlap amount between the annular groove 7b and the ports 6a increases and the opening degree of the electromagnetic valve VL increases, the opening area of the extension side bypass passage 3a increases. On the other hand, when the overlap amount between the annular groove 7b and the ports 6a decreases and the opening degree of the electromagnetic valve VL decreases, the opening area of the extension side bypass passage 3a decreases. Further, when the spool 7L moves to a position where the annular groove 7b and the ports 6a do not completely overlap and the electromagnetic valve VL is closed, the communication of the extension side bypass passage 3a is cut off.

Although not illustrated in detail, the solenoid 9L of the electromagnetic valve VL is accommodated in the solenoid case member 31L and includes a cylindrical stator including a coil, a cylindrical movable iron core movably inserted into the stator, and a plunger 9a attached to the inner periphery of the movable iron core and having a tip abutting on the plate 70L. A harness 90L that supplies power to the solenoid 9L protrudes outward through the inside of the rod main body 32L and is connected to a power supply.

When the solenoid 9L is energized through the harness 90L, the movable iron core is pulled downward, the plunger 9a moves downward, and the spool 7L is pushed down against the biasing force of the biasing spring 8L. Then, the annular groove 7b and the ports 6a face each other, and the electromagnetic valve VL is opened. The relationship between the opening degree of the electromagnetic valve VL and the energization amount to the solenoid 9L is a proportional relationship having a positive proportional constant, and the opening degree increases as the energization amount increases. Further, when the energization to the solenoid 9L is cut off, the electromagnetic valve VL is closed.

As described above, the electromagnetic valve VL of the present embodiment is of a normally closed type, and biases the spool 7L, which is a valve body thereof, in the closing direction by the biasing spring 8L and applies thrust in the opening direction to the spool 7L by the solenoid 9L. In addition, the opening degree increases in proportion to the energization amount of the electromagnetic valve VL, and the opening area of the extension side bypass passage 3a increases with the increase in the opening degree. Therefore, it can be said that the opening area of the extension side bypass passage 3a increases in proportion to the energization amount to the electromagnetic valve VL.

Figure 4:
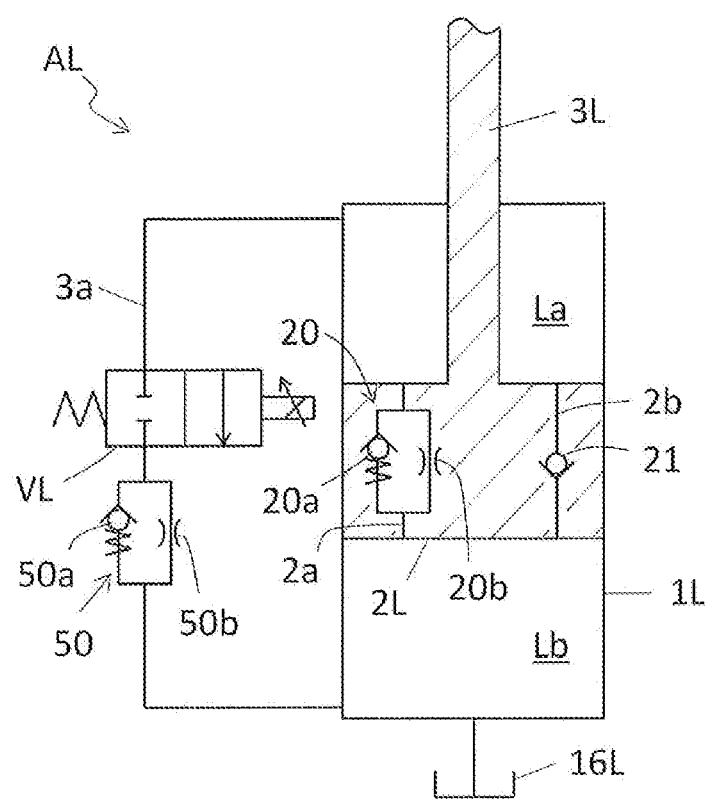
FIG. 4 is a hydraulic circuit diagram of the shock absorber on the extension side which is the shock absorber according to the embodiment of the present invention.

To summarize the above, as illustrated in FIG. 4, the shock absorber AL on the extension side includes the cylinder 1L, the piston 2L slidably inserted into the cylinder 1L to partition the inside of the cylinder 1L into the extension side chamber La and the compression side chamber Lb, the piston rod 3L whose tip is coupled to the piston 2L and whose terminal protrudes to the outside of the cylinder 1L, and the tank 16L connected to the compression side chamber Lb in the cylinder 1L, and the pressure in the compression side chamber Lb is the tank pressure.

Further, the shock absorber AL on the extension side is provided with the extension side passage 2a, the compression side passage 2b, and the extension side bypass passage 3a as passages for communicating the extension side chamber La and the compression side chamber Lb. The compression side passage 2b is provided with the compression side check valve 21 that allows only unidirectional flow of the liquid from the compression side chamber Lb to the extension side chamber La, and liquid from the extension side chamber La to the compression side chamber Lb passes through the extension side passage 2a or The extension side bypass passage 3a.

The extension side passage 2a is provided with the hard-side damping element 20 on the extension side which includes the orifice 20b and the leaf valve 20a arranged in parallel with the orifice 20b and gives resistance to the flow of the liquid. On the other hand, the extension side bypass passage 3a is provided with the soft-side damping element 50 on the extension side which includes the orifice 50b having an opening area larger than that of the orifice 20b, and the leaf valve 50a having valve rigidity lower than that of the leaf valve 20a and arranged in parallel with the orifice 50b, in which the resistance given to the flow of the liquid is reduced.

Further, the extension side bypass passage 3a is provided with the electromagnetic valve VL in series with the soft-side damping element 50 on the extension side, and the opening area of the extension side bypass passage 3a can be changed by adjusting the energization amount to the electromagnetic valve VL. The electromagnetic valve VL is of a normally closed type and is set so as to increase the opening area of the extension side bypass passage 3a in proportion to the energization amount.

Next, the shock absorber AR on the compression side that is paired with the shock absorber AL on the extension side which is the shock absorber according to the embodiment of the present invention will be described. In the present embodiment, since the basic configurations of the shock absorbers AL and AR are common, the description of the specific structure of the shock absorber AR on the compression side will be omitted.

Figure 5:
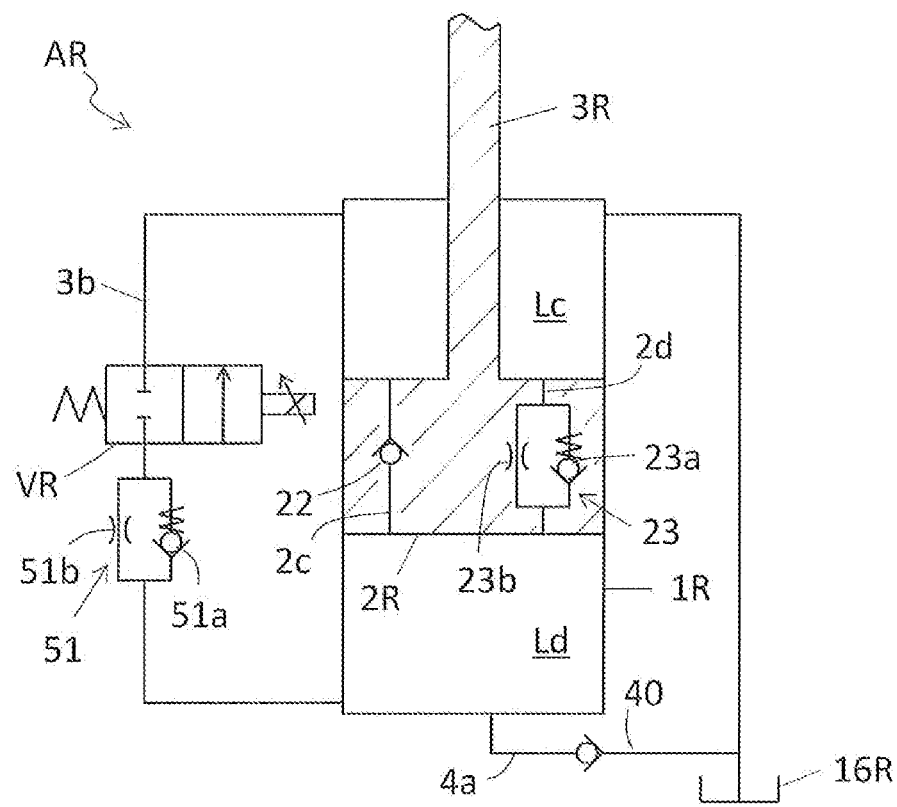
FIG. 5 is a hydraulic circuit diagram of a shock absorber on a compression side that is paired with the shock absorber on the extension side which is the shock absorber according to the embodiment of the present invention.

As illustrated in FIG. 5, the shock absorber AR on the compression side includes a cylinder 1R, a piston 2R slidably inserted into the cylinder 1R to partition the inside of the cylinder 1R into an extension side chamber Lc and a compression side chamber Ld, a piston rod 3R whose tip is coupled to the piston 2R and whose terminal protrudes to the outside of the cylinder 1R, and a tank 16R connected to the extension side chamber Lc in the cylinder 1R, and the pressure in the extension side chamber Lc is the tank pressure.

Further, the shock absorber AR on the compression side is provided with an extension side passage 2c, a compression side passage 2d, and a compression side bypass passage 3b as passages for communicating the extension side chamber Lc and the compression side chamber Ld. The extension side passage 2c is provided with an extension side check valve 22 that allows only unidirectional flow of the liquid from the extension side chamber Lc to the compression side chamber Ld, and liquid from the compression side chamber Ld to the extension side chamber Lc passes through the compression side passage 2d or the compression side bypass passage 3b.

The compression side passage 2d is provided with a hard-side damping element 23 on the compression side which includes an orifice 23b and a leaf valve 23a arranged in parallel with the orifice 23b and gives resistance to the flow of the liquid. On the other hand, the compression side bypass passage 3b is provided with a soft-side damping element 51 on the compression side which includes an orifice 51b having a diameter larger than that of the orifice 23b, and a leaf valve 51a having valve rigidity lower than that of the leaf valve 23a and arranged in parallel with the orifice 51b, in which resistance given to a flow of the liquid is reduced.

Further, the compression side bypass passage 3b is provided with the electromagnetic valve VR in series with the soft-side damping element 51, and the opening area of the compression side bypass passage 3b can be changed by adjusting the energization amount to the electromagnetic valve VR. Similarly to the electromagnetic valve VL of the shock absorber AL on the extension side, the electromagnetic valve VR is also of a normally closed type and is set so as to increase the opening area of the compression side bypass passage 3b is proportion to the energization amount.

The shock absorber AR on the compression side is provided with a suction passage 4a that communicates the compression side chamber Ld and the tank 16R, and the suction passage 4a is provided with a suction valve 40 that allows only unidirectional flow of the liquid from the tank 16R to the compression side chamber Ld.

Hereinafter, the operation of the front fork F including the shock absorber AL on the extension side which is the shock absorber according to the embodiment of the present invention, and the shock absorber AR on the compression side that is paired therewith will be described.

When the shock absorbers AL and AR extend, the piston rods 3L and 3R retract from the cylinders 1L and 1R, and the pistons 2L and 2R compress the extension side chambers La and Lc. At this time, in the shock absorber AL on the extension side, the liquid in the extension side chamber La moves to the compression side chamber Lb through the extension side passage 2a or the extension side bypass passage 3a. The resistance is applied to the flow of the liquid by the hard-side damping element 20 or the soft-side damping element 50 on the extension side, and an extension side damping force caused by the resistance is generated.

On the other hand, when the shock absorber AR on the compression side extends, the extension side check valve 22 is opened, and the liquid in the extension side chamber Lc moves to the compression side chamber Ld through the extension side passage 2c. At this time, the liquid can pass through the extension side check valve 22 with relatively no resistance. Further, the extension side chamber Lc communicates with the tank 16R and is maintained at the tank pressure. Therefore, the extension side damping force of the front fork F as a whole is mainly caused by the extension side damping force generated by the shock absorber AL on the extension side.

In addition, the distribution ratio of the liquid passing through the hard-side damping element 20 on the extension side and the liquid passing through the soft-side damping element 50 on the extension side when the shock absorber AL on the extension side extends changes according to the opening area of the extension side bypass passage 3a, whereby the damping coefficient increases or decreases to adjust the generated extension side damping force.

Specifically, as described above, the hard-side damping element 20 and the soft-side damping element 50 on the extension side include the orifices 20b and 50b and the leaf valves 20a and 50a arranged in parallel with the orifices 20b and 50b, respectively. Therefore, the damping force characteristic on the extension side becomes an orifice characteristic proportional to the square of the piston speed specific to the orifice when the piston speed is in the low speed range, and becomes a valve characteristic proportional to the piston speed specific to the leaf valve when the piston speed is in the middle and high speed range.

When the energization amount to the electromagnetic valve VL is increased to increase the opening degree, the flow rate of the extension side bypass passage 3a is increased to decrease the ratio of the liquid passing through the hard-side damping element 20 on the extension side, and increase the ratio of the liquid passing through the soft-side damping element 50 on the extension side. Since the orifice 50b of the soft-side damping element 50 is a large-diameter orifice having an opening area larger than that of the orifice 20b of the hard-side damping element 20, when the ratio of the liquid toward the soft-side damping element 50 increases, the damping coefficient decreases in both the low speed range and the middle and high speed range, and the extension side damping force generated with respect to the piston speed decreases. When the amount of current supplied to the electromagnetic valve VL is maximized, the damping coefficient is minimized, and the extension side damping force generated with respect to the piston speed is minimized.

On the contrary, when the energization amount to the electromagnetic valve VL is decreased to decrease the opening degree, the flow rate of the extension side bypass passage 3a is decreased to increase the ratio of the liquid passing through the hard-side damping element 20 on the extension side, and decrease the ratio of the liquid passing through the soft-side damping element 50 on the extension side. Then, the damping coefficient increases in both the low speed range and the middle and high speed range, and the extension side damping force with respect to the piston speed increases. When the energization to the electromagnetic valve VL is cut off and the electromagnetic valve VL is closed, the communication of the extension side bypass passage 3a is cut off, so that the total flow passes through the hard-side damping element 20 on the extension side. Then, the damping coefficient is maximized, and the extension side damping force generated with respect to the piston speed is maximized.

Figure 6:
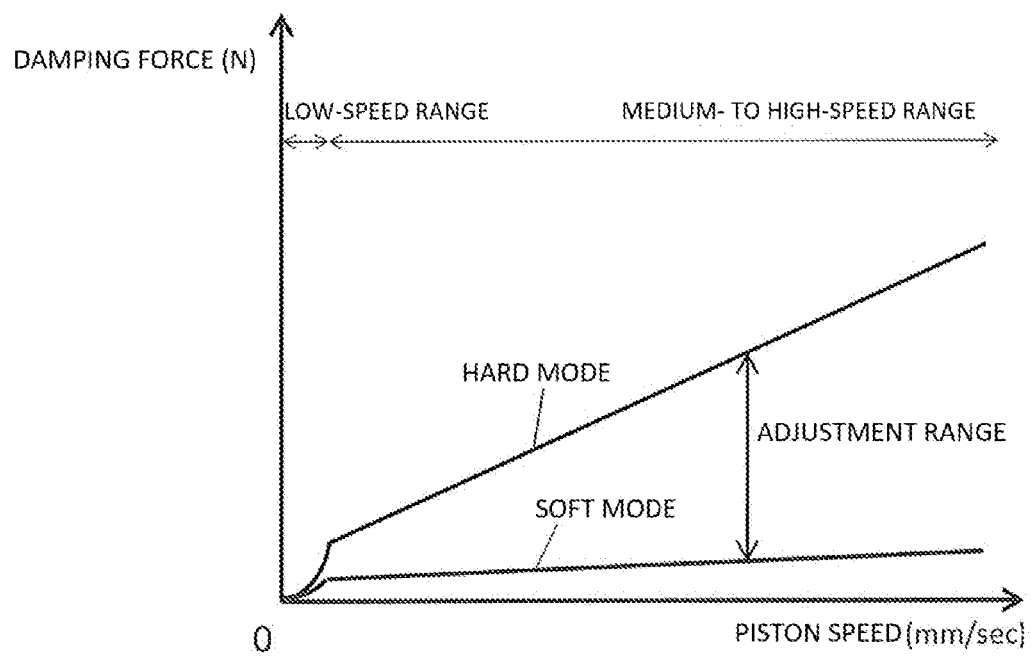
FIG. 6 is a damping force characteristic diagram showing a characteristic of an extension side damping force with respect to a piston speed of the shock absorber on the extension side which is the shock absorber according to the embodiment of the present invention.
Figure 7:
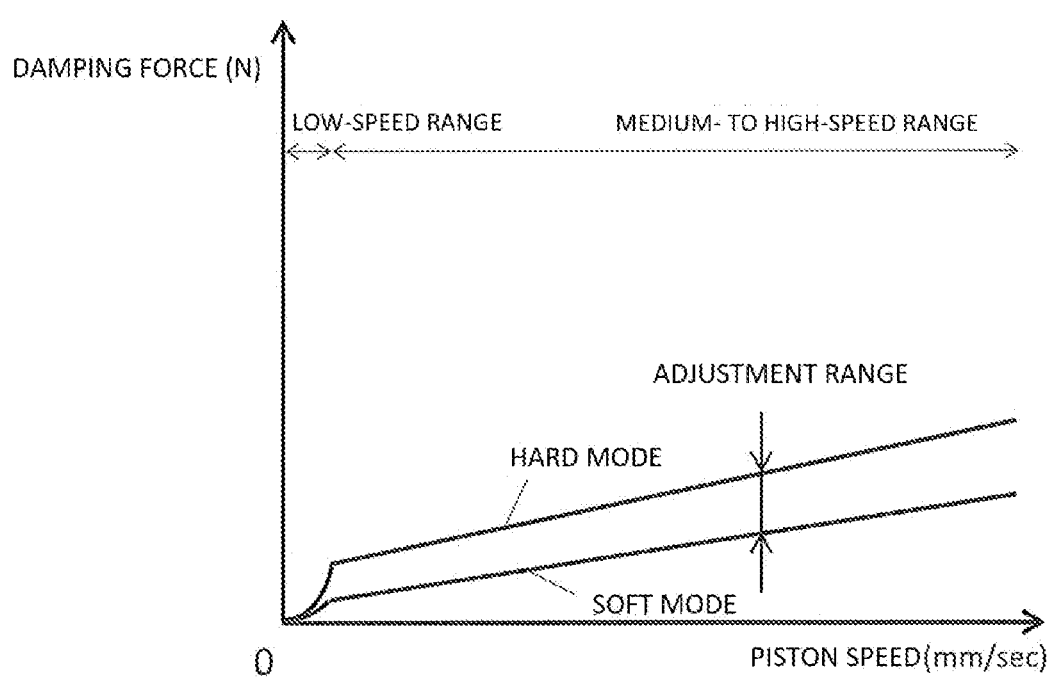
FIG. 7 is a damping force characteristic diagram showing a characteristic of a damping force with respect to a piston speed of a shock absorber including a conventional needle valve.
Figure 8:
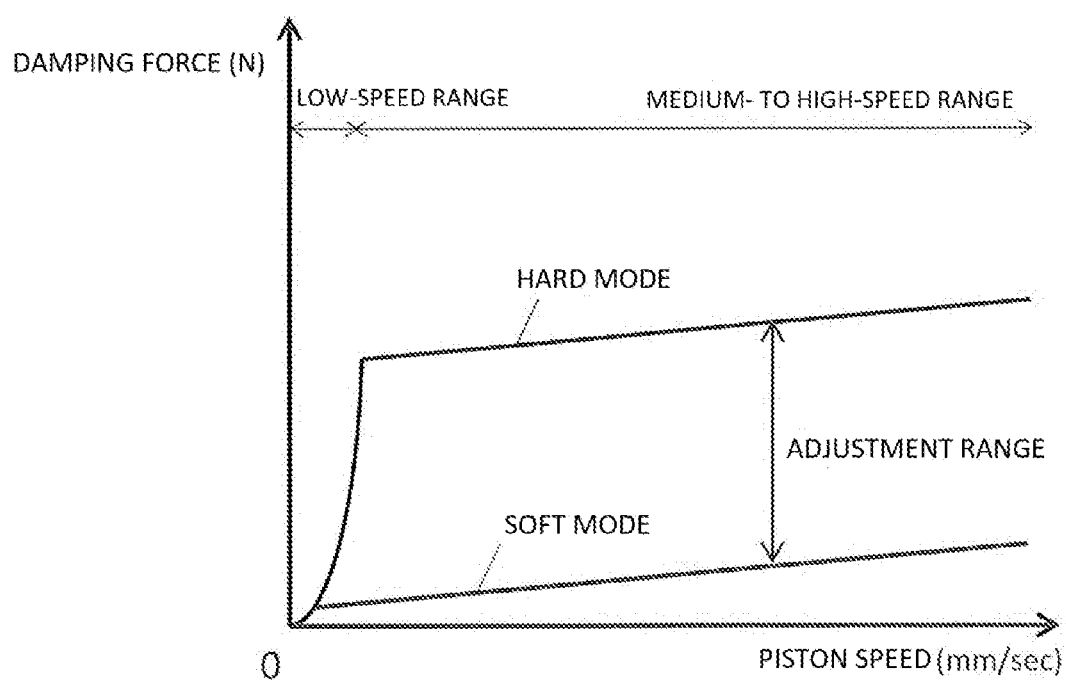
FIG. 8 is a damping force characteristic diagram showing a characteristic of a damping force with respect to a piston speed of a shock absorber including a conventional pilot valve.

As described above, when the distribution ratio of the liquid passing through the hard-side damping element 20 and the liquid passing through the soft-side damping element 50, which are the first and second damping elements on the extension side, is changed by the electromagnetic valve VL, the damping coefficient increases or decreases and the inclinations of the characteristic lines indicating the damping force characteristic on the extension side change as shown in FIG. 6. Then, the extension side damping force is adjusted between a hard mode in which the damping force generated by maximizing the inclination of the characteristic line is increased and a soft mode in which the damping force generated by minimizing the inclination is decreased.

In the soft mode, the inclination of the characteristic line indicating the damping force characteristic decreases in both the low speed range and the middle and high speed range, and in the hard mode, the inclination of the characteristic line indicating the damping force characteristic increases in both the low speed range and the middle and high speed range. Therefore, a change when the damping force characteristic shifts from the orifice characteristic to the valve characteristic is gentle in any mode.

Further, the soft-side damping element 50 includes the leaf valve 50a having low valve rigidity in parallel with the orifice 50b. Therefore, even if a valve having high valve rigidity and a high valve opening pressure is employed as the leaf valve 20a of the hard-side damping element 20 and the adjustment range in the direction of increasing the extension side damping force is increased, the damping force in the soft mode does not become excessive.

Further, when the shock absorber AL on the extension side extends, the liquid corresponding to the volume of the piston rod 3L that has retracted from the cylinder 1L is supplied from the tank 16L to the compression side chamber Lb. On the other hand, when the shock absorber AR on the compression side extends, the suction valve 40 is opened, and the liquid corresponding to the volume of the piston rod 3R that has retracted from the cylinder 1R is supplied from the tank 16R to the compression side chamber Ld through the suction passage 4a.

On the other hand, when the shock absorbers AL and AR contract, the piston rods 3L and 3R enter the cylinders 1L and 1R, and the pistons 2L and 2R compress the compression side chambers Lb and Ld. At this time, in the shock absorber AR on the compression side, the liquid in the compression side chamber Ld moves to the extension side chamber Lc through the compression side passage 2d or the compression side bypass passage 3b. The resistance is applied to the flow of the liquid by the hard-side damping element 23 on the compression side or the soft-side damping element 51 on the compression side, and a compression side damping force caused by the resistance is generated.

On the other hand, when the shock absorber AL on the extension side contracts, the compression side check valve 21 is opened, and the liquid in the compression side chamber Lb moves to the extension side chamber La through the compression side passage 2b. At this time, the liquid can pass through the compression side check valve 21 with relatively no resistance. Further, the compression side chamber Lb communicates with the tank 16L and is maintained at the tank pressure. Therefore, the compression side damping force of the front fork F as a whole is mainly caused by the compression side damping force generated by the shock absorber AR on the compression side.

In addition, the distribution ratio of the liquid passing through the compression side hard-side damping element 23 and the liquid passing through the compression side soft-side damping element 51 when the shock absorber AR on the compression side contracts changes according to the opening area of the compression side bypass passage 3b, whereby the damping coefficient increases or decreases to adjust the generated compression side damping force.

Similarly to the hard-side damping element 20 and the soft-side damping element 50 on the extension side, the hard-side damping element 23 and the soft-side damping element 51 on the compression side include the orifices 23b and 51b and the leaf valves 23a and 51a arranged in parallel with the orifices 23b and 51b, respectively, and the orifice 51b of the soft-side damping element 51 is a large-diameter orifice having an opening area larger than that of the orifice 23b of the hard-side damping element 23.

Therefore, also at the time of contraction, in the soft mode, the inclination of the characteristic line indicating the damping force characteristic decreases in both the low speed range and the middle and high speed range, and in the hard mode, the inclination of the characteristic line indicating the damping force characteristic increases in both the low speed range and the middle and high speed range. Therefore, also at the time of contraction, a change when the damping force characteristic shifts from the orifice characteristic to the valve characteristic can be made gentle in any mode.

When the shock absorber AR on the compression side contracts, the liquid corresponding to the volume of the piston rod 3R that has entered the cylinder 1R is discharged from the extension side chamber Lc to the tank 16R. On the other hand, when the shock absorber AL on the extension side contracts, the liquid corresponding to the volume of the piston rod 3L that has entered the cylinder 1L is discharged from the compression side chamber Lb to the tank 16L.

Hereinafter, functions and effects of the shock absorber AL on the extension side which is the shock absorber according to the embodiment of the present invention and the front fork F including the shock absorber AL on the extension side and the shock absorber AR on the compression side will be described.

The shock absorber (shock absorber) AL on the extension side according to the present embodiment includes the cylinder 1L, the piston 2L that is inserted into the cylinder 1L so as to be movable in the axial direction and partitions the inside of the cylinder 1L into the extension side chamber La and the compression side chamber Lb, and the piston rod 3L that is coupled to the piston 2L and has one end protruding to the outside of the cylinder 1L.

Furthermore, the shock absorber AL on the extension side includes the hard-side damping element 20 that gives resistance to the flow of liquid from the extension side chamber La to the compression side chamber Lb, the electromagnetic valve VL that can change the opening area of the extension side bypass passage (bypass passage) 3a that bypasses the hard-side damping element 20 and communicates the extension side chamber La and the compression side chamber Lb, and the soft-side damping element 50 provided in series with the electromagnetic valve VL in the extension side bypass passage 3a. The hard-side damping element 20 includes the orifice 20b and the leaf valve 20a provided in parallel with the orifice 20b. On the other hand, the soft-side damping element 50 includes the orifice (large-diameter orifice) 50b having an opening area larger than that of the orifice 20b.

According to the above configuration, the characteristic of the damping force generated when the shock absorber AL on the extension side extends becomes the orifice characteristic specific to the orifice when the piston speed is in the low speed range, and becomes the valve characteristic specific to the leaf valve when the piston speed is in the middle and high speed range. When the opening area of the extension side bypass passage 3a is changed by the electromagnetic valve VL, the distribution ratio of the flow passing through the hard-side damping element 20 and the flow passing through the soft-side damping element 50 in the liquid moving from the extension side chamber La to the compression side chamber Lb when the shock absorber AL on the extension side extends is changed, so that both the damping coefficient when the piston speed is in the low speed range and the damping coefficient when the piston speed is in the middle and high speed range can be freely set, and the adjustment range of the compression side damping force when the piston speed is in the middle and high speed range can be increased.

Further, the soft mode in which the opening area of the extension side bypass passage 3a is increased, both the damping coefficient when the piston speed is in the low speed range and the damping coefficient when the piston speed is in the middle and high speed range are decreased. On the other hand, in the hard mode in which the opening area of the extension side bypass passage 3a is reduced, both the damping coefficient when the piston speed is in the low speed range and the damping coefficient when the piston speed is in the middle and high speed range are increased. Therefore, when the characteristic of the extension side damping force changes from the orifice characteristic in the low speed range to the valve characteristic in the middle and high speed range, the change in the inclination of the characteristic line is gentle in any mode.

In the shock absorber AL on the extension side according to the present embodiment, the soft-side damping element 50 includes the orifice (large-diameter orifice) 50b and the leaf valve 50a provided in parallel with the orifice 50b. As described above, when the leaf valve 50a is provided also in the soft-side damping element 50, even if the leaf valve 20a of the hard-side damping element 20 is a valve having high valve rigidity and a high valve opening pressure, the damping force in the soft mode does not become excessive. That is, according to the above configuration, a valve having high valve rigidity can be employed as the leaf valve 20a of the hard-side damping element 20. In this case, the adjustment range of the damping force in the direction of increasing the extension side damping force is increased, so that the adjustment range of the compression side damping force can be further increased when the piston speed is in the middle and high speed range.

In the shock absorber AL on the extension side of the present embodiment, the piston 2L is coupled to the other end of the piston rod 3L to form a single-rod type. Further, the shock absorber AL on the extension side includes the tank 16L, connected to the compression side chamber Lb, and the compression side check valve (check valve) 21 that allows only the flow of the liquid from the compression side chamber Lb to the extension side chamber La. According to this configuration, the volume of the piston rod 3L moving in and out of the cylinder 1L can be compensated by the tank 16L. Furthermore, the shock absorber AL on the extension side can be a unidirectional shock absorber that exerts a damping force only in an extension stroke.

The front fork F includes the shock absorber AR on the compression side that is paired with the shock absorber AL on the extension side. The shock absorber AR on the compression side is a unidirectional shock absorber that exerts a damping force only in a contraction stroke. The distribution ratio of the flow passing through the hard-side damping element 23 on the compression side and the flow passing through the soft-side damping element 51 on the compression side in the liquid moving from the compression side chamber Ld to the extension side chamber Lc can be changed in accordance with the opening degree of the electromagnetic valve VR to adjust the generated compression side damping force. Further, the hard-side damping element 23 on the compression side and the soft-side damping element 51 on the compression side include the orifices 23b and 51b, and the leaf valves 23a and 51a arranged in parallel with the orifices 23b and 51b, respectively.

Therefore, in the front fork F, the adjustment ranges of the damping forces on both the extension side and the compression side when the piston speed is in the middle and high speed range can be increased. Further, in the front fork F, when the damping force characteristic changes from the orifice characteristic in the low speed range to the valve characteristic in the middle and high speed range, the change in the inclination of the characteristic line can be made gentle on both the extension side and the compression side in any mode. For this reason, when the front fork F is mounted on the vehicle, the discomfort caused by the chance in the inclination can be further reduced, and the ride comfort of the vehicle can be further improved.

The electromagnetic valves VL and VR of the shock absorbers AL and AR of the present embodiment are set so That the opening degree changes in proportion to the energization amount. According to this configuration, the opening areas of the extension side bypass passage 3a and the compression side bypass passage 3b can be changed steplessly.

In addition, in the shock absorber AL on the extension side of the present embodiment, the electromagnetic valve VL includes the cylindrical holder 6L having the ports 6a formed therein and connected to the extension side bypass passage 3a, the cylindrical spool 7L that is reciprocably inserted into the holder 6L and can open and close the ports 6a, the biasing spring 8L that biases the spool 7L to one side in the moving direction of the spool 7L, and the solenoid 9L that applies a thrust in a direction opposite to the biasing force of the biasing spring 8L to the spool 7L.

Here, for example, as in the electromagnetic valve described in JP 2010-7758 A, in a case where a needle valve capable of reciprocating is provided as a valve body and the opening degree is changed by increasing or decreasing a gap formed between a tip end of the needle valve and a valve seat, it is necessary to increase a stroke amount of the valve body in order to increase an adjustment range of the opening degree, but this may not be possible.

Specifically, when a stroke amount of the needle valve is increased, a movable space of the needle valve increases, and it becomes difficult to secure an accommodating space. In addition, when a stroke amount of a plunger of a solenoid is to be increased in order to increase the stroke amount of the needle valve, it is necessary to change the design of the solenoid, which is complicated. Furthermore, when the stroke amount of the needle valve is to be increased without changing the design of the solenoid, a component for increasing a movement amount of the needle valve with respect to a movement amount of the plunger is required, and the number of components increases, and it becomes difficult to secure the accommodating space.

On the other hand, in the electromagnetic valve VL of the present embodiment, the ports 6a formed in the holder 6L are opened and closed by the spool 7L reciprocably inserted into the cylindrical holder 6L, whereby the electromagnetic valve VL is opened and closed. Therefore, by forming the plurality of ports 6a in the circumferential direction of the holder 6L or forming the ports 6a in a shape elongated in the circumferential direction, the opening degree of the electromagnetic valve VL can be increased without increasing the stroke amount of the spool 7L which is the valve body of the electromagnetic valve VL. Therefore, the adjustment range of the opening degree of the electromagnetic valve VL can be increased, and the adjustment range of the extension side damping force can be easily increased.

Furthermore, according to the above configuration, the relationship between the opening degree and the energization amount of the electromagnetic valve VL, can be easily changed. For example, in a case where the relationship between the opening degree and the energization amount of the electromagnetic valve VL is set to a negative proportional relationship having a negative proportional constant, and it is desired to decrease the opening degree as the energization amount increases, the ports 6a or the annular groove 7b for opening the ports 6a may be arranged at a position where the ports 6a open to the maximum at the time of non-energization.

In this manner, the relationship between the opening degree and the energization amount of the electromagnetic valve VL can be freely changed. In addition, the above configuration may be applied to the electromagnetic valve VR of the shock absorber AR on the compression side, and it is a matter of course that the relationship between the opening degree and the energization amount of the electromagnetic valve VR can be appropriately changed. Furthermore, the method of adjusting the compression side damping force in the shock absorber AR on the compression side may have a structure completely different from that of the shock absorber AL on the extension side, and the configuration of the shock absorber AR on the compression side can be freely changed.

Although the preferred embodiment of the present invention has been described above in detail, modifications, variations and changes are possible without departing from the scope of the claims.

REFERENCE SIGNS LIST

AL shock absorber
La extension side chamber
Lb compression side chamber
VL electromagnetic valve
1L cylinder
2L piston
3L piston rod
3a extension side bypass passage (bypass passage)
6L holder
6a port
7L spool
8L biasing spring
9L solenoid
16L tank
20 hard-side damping element
20a leaf valve
20b orifice
21 compression side check valve (check valve)
50 soft-side damping element
50a leaf valve
50b orifice (large-diameter orifice)

The invention claimed is:

1. A shock absorber comprising:
a cylinder;
a piston that is inserted into the cylinder so as to be movable in an axial direction and partitions an inside of the cylinder into an extension side chamber and a compression side chamber;
a piston rod that is coupled to the piston and has one end protruding to an outside of the cylinder;
a hard-side damping element that gives resistance to a flow of liquid from the extension side chamber to the compression side chamber;
an electromagnetic valve capable of changing an opening area of a bypass passage that bypasses the hard-side damping element and communicates the extension side chamber and the compression side chamber; and
a soft-side damping element provided in the bypass passage in series with the electromagnetic valve,
wherein the hard-side damping element includes an orifice and a leaf valve provided in parallel with the orifice, and
wherein the soft-side damping element includes a large-diameter orifice having an opening area larger than an opening area of the orifice.

2. The shock absorber according to claim 1, wherein the soft-side damping element includes a leaf valve provided in parallel with the large-diameter orifice.

3. The shock absorber according to claim 1, wherein an opening degree of the electromagnetic valve changes in proportion to an energization amount.

4. The shock absorber according to claim 1, wherein the electromagnetic valve includes a cylindrical holder having a port formed therein and connected to the bypass passage, a spool that is reciprocatably inserted into the holder and can open and close the port, a biasing spring that biases the spool to one side in a moving direction of the spool, and a solenoid that applies a thrust in a direction opposite to a biasing force of the biasing spring to the spool.

5. The shock absorber according to claim 1, further comprising:
- a tank connected to the compression side chamber; and
- a check valve that allows only a flow of liquid from the compression side chamber toward the extension side chamber, wherein the piston is coupled to the other end of the piston rod.

* * * * *